(12) United States Patent
Lahmann

(10) Patent No.: US 6,374,365 B1
(45) Date of Patent: Apr. 16, 2002

(54) ARRANGEMENT FOR OPERATING TWO FUNCTIONALLY PARALLEL PROCESSORS

(76) Inventor: Alexander E. E. Lahmann, Sunderweg 5, D-44147 Dortmund (DE)

( * ) Notice: Subject to any disclaimer, the term of this patent is extended or adjusted under 35 U.S.C. 154(b) by 0 days.

(21) Appl. No.: 09/214,444

(22) PCT Filed: Jun. 25, 1997

(86) PCT No.: PCT/EP97/03330

§ 371 Date: Sep. 9, 1999

§ 102(e) Date: Sep. 9, 1999

(87) PCT Pub. No.: WO98/00782

PCT Pub. Date: Jan. 8, 1998

(30) Foreign Application Priority Data

Jun. 29, 1996 (DE) .......................................... 196 26 184

(51) Int. Cl.[7] ................................................ H04B 1/74
(52) U.S. Cl. ........................ 714/12; 710/100; 327/142
(58) Field of Search ...................... 714/12, 11; 713/500; 327/142, 292; 710/100

(56) References Cited

U.S. PATENT DOCUMENTS

| | | | |
|---|---|---|---|
| 4,577,225 A | * 3/1986 | Pritchard | .................... 348/448 |
| 4,589,066 A | * 5/1986 | Lam et al. | |
| 4,633,039 A | 12/1986 | Holden | ......................... 379/32 |
| 5,249,188 A | 9/1993 | McDonald | ................. 371/68.3 |
| 5,293,626 A | * 3/1994 | Priest et al. | ................. 713/401 |
| 5,615,327 A | * 3/1997 | Magee et al. | .................. 714/12 |

OTHER PUBLICATIONS

Guinea, Jesus and Tomasini, Luciano "A Single Chip 155Mbps/140Mbps SDH/PDH Transceiver", 2000, pp. 315–318.*

Davies et al., "Synchronization and Matching in Redundant Systems", 8092 IEEE Trans on Computers, vol. C–27, No. 6, Jun. 6, 1978, pp. 531–539.

* cited by examiner

Primary Examiner—Robert Beausoleil
Assistant Examiner—R Ziemer
(74) Attorney, Agent, or Firm—Pandiscio & Pandiscio

(57) ABSTRACT

The invention pertains to the arrangement of two processors in a single computer, said processors being linked via a functional module that enables the two processors to operate in parallel to produce a single output signal for peripherals.

13 Claims, 5 Drawing Sheets

ARRANGEMENT FOR OPERATING TWO FUNCTIONALLY PARALLEL PROCESSORS

Figure 1:
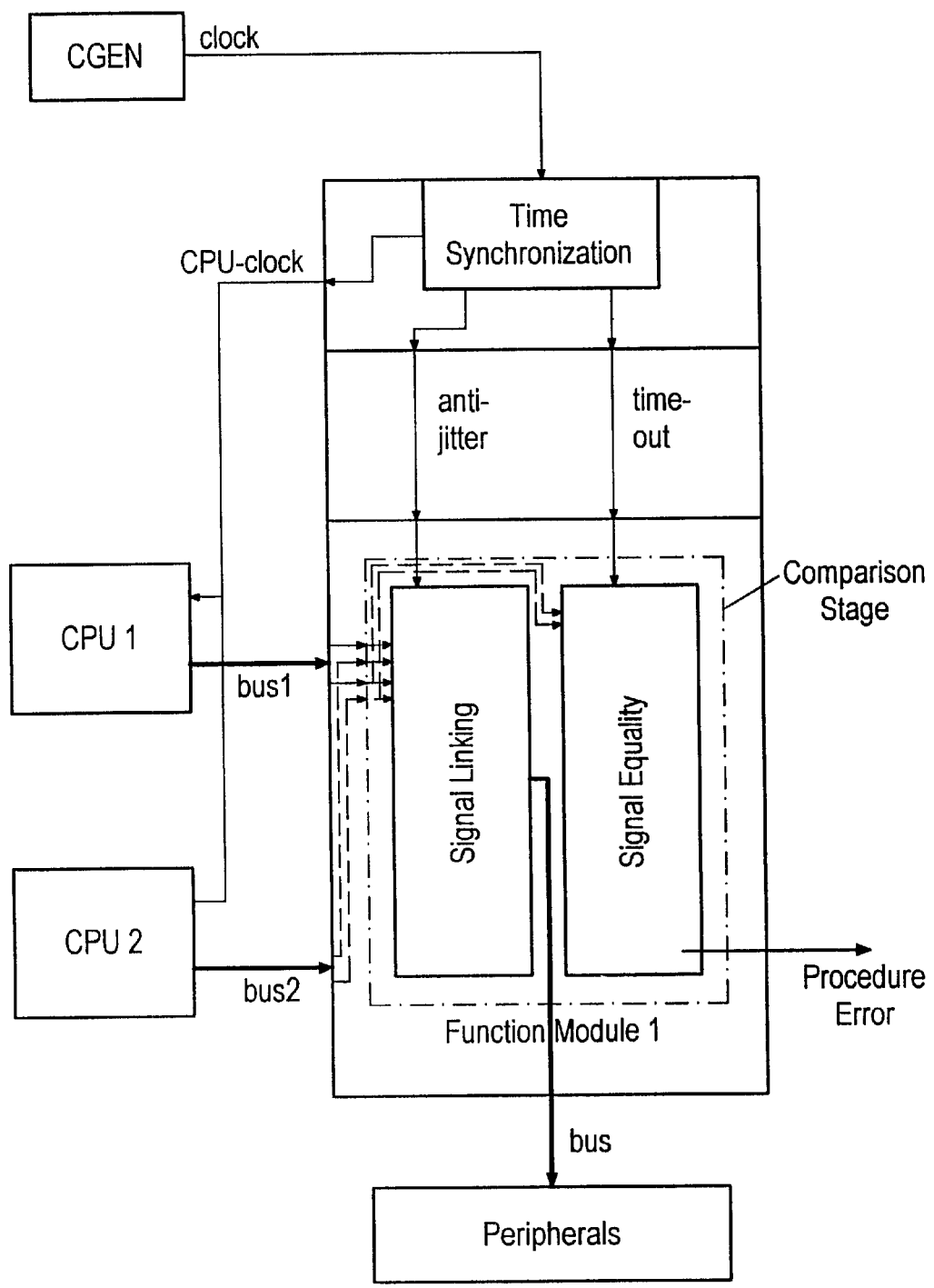

The present invention concerns a device for operating two functionally parallel computers.

Processors of this kind are used in digital computers. Computers of this kind are either fixed-programmed automatic control systems or programmable computers, mainframe computers, and PCs.

The main components of such computers are the input and output means, the memory, the processor, and the clock generator.

The input and output means and the memory are customarily designated as peripherals. Processors may be divided into a processing processor and an input-output processor. In the conventional PCs of today, the processing and the input-output processors are combined into the "processor." Nevertheless, the present invention pertains to individual processors such as processing processors and input-output processor of mainframe computers and the conventional "processors" of PCs and home computers of today. When processors are referred to alone below, the above variants are included. The control of peripherals takes place through the processor via bus lines. The processing clock pulses of the processor are provided by the clock signal generator. This is a continuous time signal series, the processor carrying out a predetermined computational process with each clock signal. The frequency of the clock signals is therefore a direct measure of the computational speed of the processor. The computational speed of the processor is therefore to be matched with respect to the frequency of the clock signal generator such that one computational operation is completed before the next clock pulse comes.

Processors are very highly integrated semiconductor circuits which naturally are subject, even under the most precise manufacturing conditions, to a certain degree of manufacturing tolerance. The processing reliability of the processors, however, is not thereby impaired. Within the specified manufacturing tolerance, the functioning reliability of the processor is always present, as long as disturbances do not impair processing reliability.

The danger does indeed exist that the function of a processor can be impaired through external disturbances. These disturbances are coupled into the computer through electrical or magnetic fields from the outside and cause the induction of voltages in conductive parts and conductive connections of highly integrated processors.

The induced voltages occur stochastically and are independent of clock. They elicit interference currents. These interference currents are superimposed on the currents within the processor and in the process induce unpredictable malfunctions.

These induced voltages can therefore result in information which comes from the processor unit to the memory modules being corrupted.

This corruption leads to undesired results in the output data of the computer. If the data transferred represent program steps, often a malfunction will occur due to accidentally interrupted programs or programs which are continued at some other, erroneous place. The effects are again undesired actions of the processor.

There are already efforts to increase the operating reliability of processor-controlled devices. In the arrangement according to DE-OS 26 12 100 (German Published Patent Application 26 12 100), two complete computers are connected in parallel and the output signals of the two computers are compared to each other in a seal-in circuit. After the comparison clock pulse comes the next active processing clock pulse.

The seal-in circuit forms a functional module in which the applied individual, synonymous output signals of the two processors are sequentially compared with each other. This takes place via a query sequence which does not pass over to the next signal until the prior signal has been checked. Since there are always numerous synonymous signals at the bus conductors to check, the sequential query of the individual synonymous signals is associated with considerable expenditure of time. Only after running through the entire query sequence is the next valid clock pulse then transmitted to the processors if all synonymous output signals are in agreement.

The progress of computation for the two processors in DE OS 26 12 100 is thus dependent on the passthrough time needed to check the output signals of the preceding work pulse for agreement.

Other customary solutions—in particular those for applications with very high reliability requirements in the fields of aviation and space travel—consider the entire computer, comprised of processor, memory, and inputs and outputs, as a closed unit. It is then assumed that this unit can generate undesired results at the outputs. For this reason, the entire computer is made redundant, for example threefold or fivefold design, and the outputs are connected through suitable coordinating elements such that the possibly false results of one of the computers is agreed with the results of the other computers.

This multiple design of the computer components, however, always creates high costs. Except for special individual applications, however, these costs are not justified. Nevertheless, for applications with higher reliability requirements, an increased disturbance reliability and improved processing reliability is desired.

In industrial control technology, there are such applications with a high degree of reliability requirement, for example, for machine controls and in drive technology. In these applications, malfunctions of a controlling computer can cause great material damage. The redundant design of the computer, however, often is out of the question for reasons of cost. Therefore safety-relevant functions such as end disconnects are often installed in separate hardware, for example via external sensors, switches, and actuators, to which the controlling computer does not have access. In this way, important disconnection operations can be carried out even with the loss of the controlling computer. This parallel-installed technology, however, also often causes high costs which must be incurred in addition to the costs for the actually desired control function of the computer. Furthermore, the external accessory systems restrict the functionality and flexibility which are the very reason the computer is utilized.

In addition, a so-conceived disconnect does not intervene in the process until a malfunction of the machine which is to be controlled occurs and can no longer be reversed.

Therefore the external accessory devices are also given the task of stopping the ongoing process in a timely manner such that despite the error in the controlling computer which has occurred, material damage is prevented.

Therefore the functional relationships between the process parameters and any malfunctions of the computer must be analyzed in advance so that they can be recognized in time by emergency stop controls controlled in this manner.

The complexity of systems of this kind therefore presupposes a full measure of external accessory equipment in order to be able to detect all probable eventualities in a timely manner in order to be able to execute the necessary emergency stop.

The object of the invention is to further develop the known device such that a processor circuit with increased operation reliability is realized while maintaining the safety requirements and at the same time having increased possibilities for application in industry.

The invention provides the advantage that without loss of computer performance and with low costs, the operating reliability of the computer is disproportionately increased.

The disproportionate increase is based on the fact that the probability of simultaneous loss of two processors is less by an order of magnitude than the probability of the loss of a single processor.

Since the invention can be used with processors of any kind, thus also with input/output processors, processing processors, and mathematical co-processors, there is the additional advantage that in a targeted manner, it is possible to provide only certain types of processors in a computer with the increased operating reliability.

What types of processors are affected in an individual instance can be determined based on design criteria. The process according to the present invention in any case is independent of the type of the particular affected processor.

This advantage is realized in that two processors of the same construction -operated parallel to each other in a single computer—are connected to a functional module clocked simultaneously with the processors whereby the operating control of the two processors takes place through comparison of the synonymous output signals simultaneously with their occurrence and whereby the output signals are combined into a single output signal for the peripheral equipment.

Accordingly it is significant for the invention that the two processors are operated parallel to each other. The operating speed is specified by a single clock pulse generator for the entire system. The clock pulse signals of the clock pulse generator are conditioned parallel such that the signals CPU clock, anti-jitter, and time-out are generated in a time-delayed manner.

Each processor receives its command for executing a given computational step from the signal CPU clock. An output signal results from the computational step within a predetermined time. The output signal is transmitted to the functional module through the bus line assigned to each processor. There a check is made to determine whether the two synonymous output signals lie within the specified manufacturing-related tolerance fields which occur in processors which otherwise are of the same construction.

It is accordingly of essential significance for the invention that the checking of the synonymous output signals take place simultaneously with their occurrence. The invention makes it possible to check the signal synchronously during that time in which the like output signals are output at the same signal level over the bus lines. In the case of the presence of two like and synonymous signals, that control signal is generated which should be used for driving the peripherals.

For this purpose, anti-jitter and time-out signals are generated which are time-delayed to the CPU clock signal. The time delay is necessary in order to take into account signal travel time from the processor to the functional module and at the same time to take into account component-tolerance-based time delay between the output signals of the two processors.

The "anti-jitter" signal is generated from the signal of the clock pulse generator. Since each clock pulse has a signal with a rising and a falling edge, a short pulse can be generated from the rising edge or from the falling edge, the running time of which is only a fraction of the time interval between two successive clock pulses. The short pulses produce a sequence of pulses which are designated here as "anti-jitter" signal.

Each pulse of the anti-jitter signal is used to query the synonymous output signals of the processors for identity. Accordingly, each pulse of the anti-jitter signal will trigger the check of equality if the two processors have identical output signals taking into account the component-tolerance-based time delay.

At a point in time at which the synonymous signals of the two processors after running through all of the component-tolerance-based differences must finally be equal, equality is tested with the pulse of the time-out signal. If at this inquiry—independent of the actual signal level being 0 or 1—it is determined that the signals which are expected to be synonymous are unlike, a "procedure error" display signal is triggered.

Therefore with a device of this kind, the component-tolerance-based time delay of processors can only be performed according to two criteria. The first criterion checks whether the time delay is still acceptable. This would make the output signals capable of being evaluated. The second criterion checks whether the time delay is no longer acceptable. The time-out signal would then become active and a corresponding procedure error is displayed.

It is therefore of special significance that, with the present invention, monitoring takes place through the functional module during the processing pulses of the two processors, it being possible during the monitoring for the two processors to be operated at full working speed. This is made possible in that the monitoring of the output signals takes place as long as the synonymous signals of the two processors have matching signals.

If the synonymous signals of the two processors are applied to the inputs of an EXOR gate, the signal "0" is present at the output of the EXOR gate as long as a matching signal level is applied at the two inputs.

The desired output signal of the signal linkage can be generated with an OR or with an AND gate. Then the output signal would be present as long as the time differential between the arrival of the first output signal of the leading processor and the end of the output signal of the trailing processor. In a specialized further development, the anti-jitter signal is clocked with such a large time delay that the same signal levels of the output signals of the processors in each case must occur within two successive clock pulses of the anti-jitter signal to the extent both processors are functioning properly. In this process, unlike levels of output signals are immediately obvious to the extent they lie outside of the component tolerances of the processors. Therefore errors in the functional procedure in one of the two processors become immediately obvious because within the clock pulse of the anti-jitter signal, like signal levels are expected from synonymous signals. As a result, the checking of the output signals can occur in a first stage =anti-jitter in that the output signals of the processors are decoupled from each other electrically and are linked to a test signal which is scanned by the edge signal (=anti-jitter) at its specified time-delayed clock pulses. In so doing, the particular scanned test signal is held stable until the next scanning point by an output memory, and the signal which is held stable is evaluated as output signal for the peripherals.

The electrical decoupling can take place across an OR gate or across an AND gate.

With the use of an OR gate, the average current consumption of the bus signal line is less than with the use of an AND gate.

Nevertheless, AND gates may also readily be used for the invention.

In a second stage (=time-out), the output signals of the two processors are simultaneously queried for equality at points in time, at which the same signal levels of the output signals must be present with consideration for the known component tolerances. Since the output signals are present in each case in pairs, the procedure error signal can be outputted in the event of signal level deviation of even a single pair of output signals.

Embodiment examples are given for this. Advantageous embodiment forms are found in the subclaims. The invention is explained in greater detail with the aid of embodiment examples.

The figures show:

FIG. 1 A first block diagram of the invention

Figure 2:
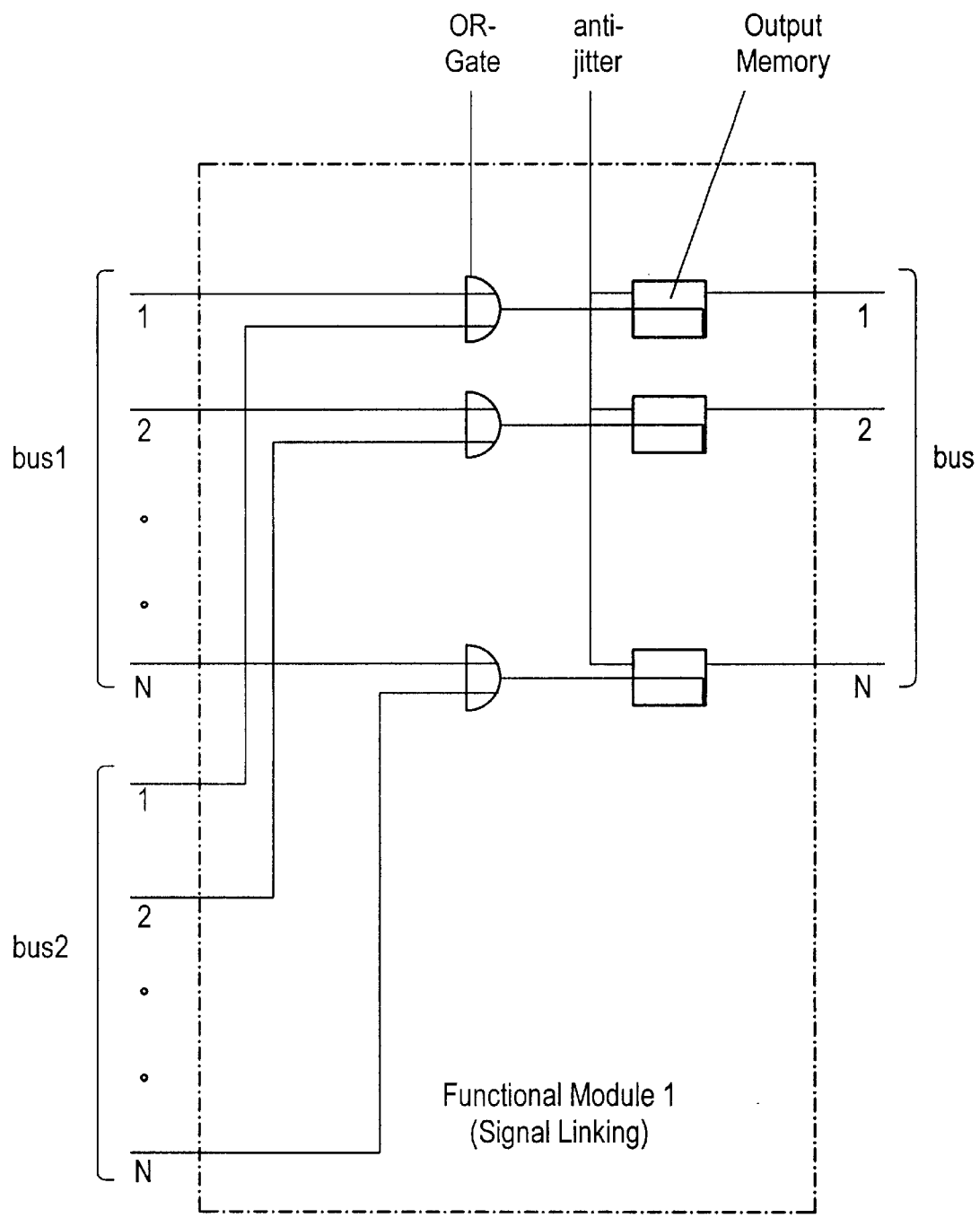
Figure 3:
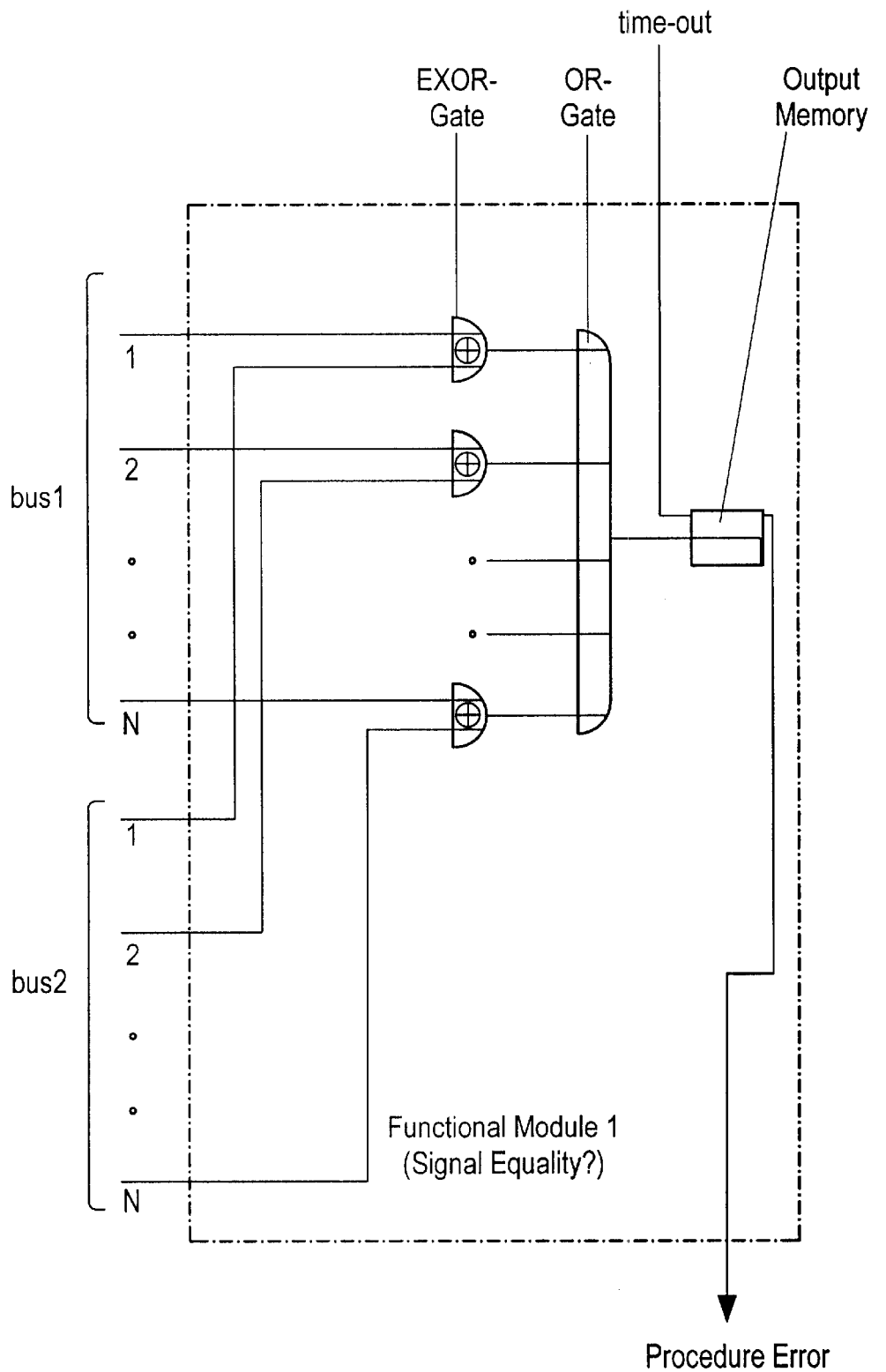
Figure 4:
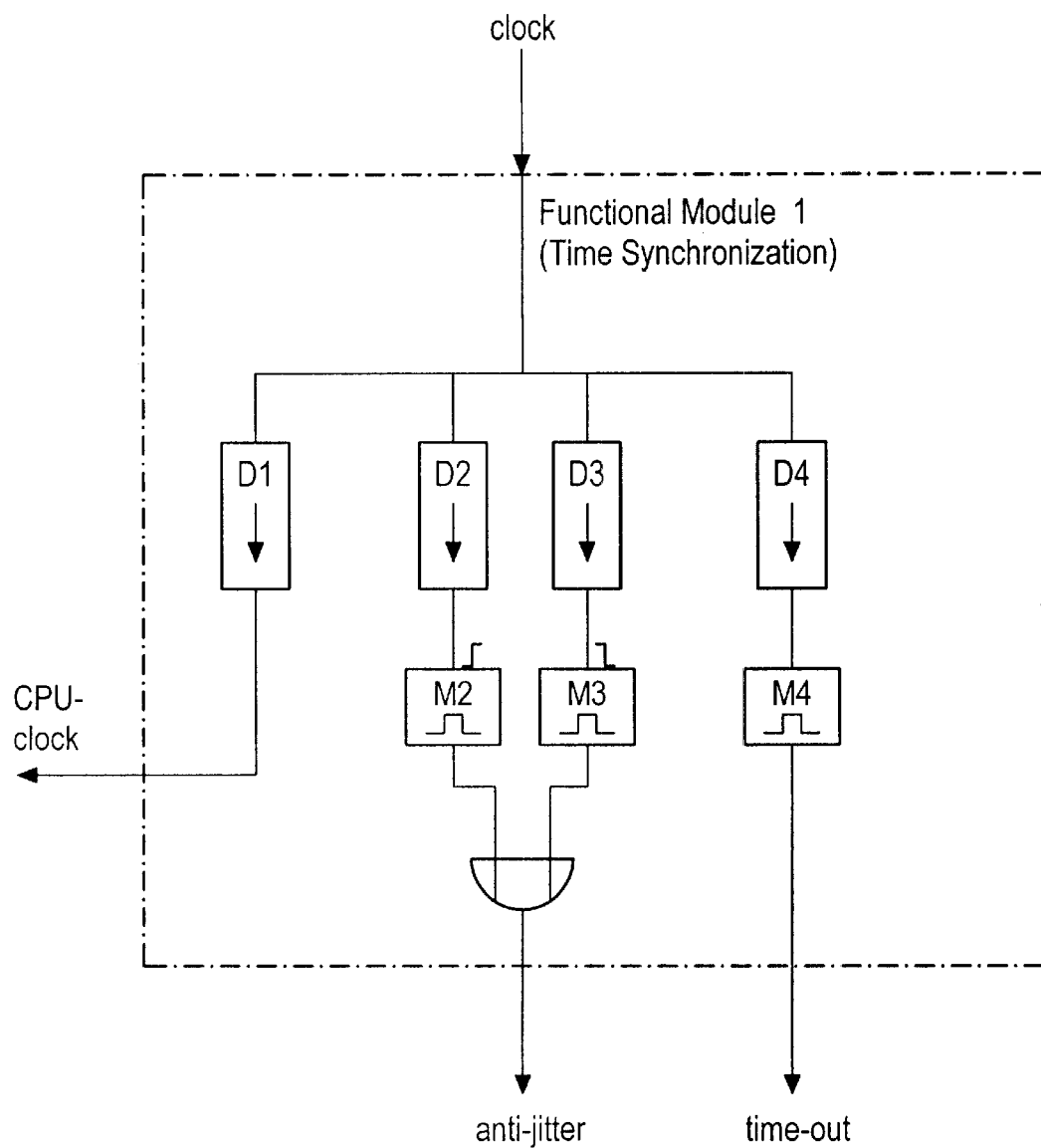
Figure 5:
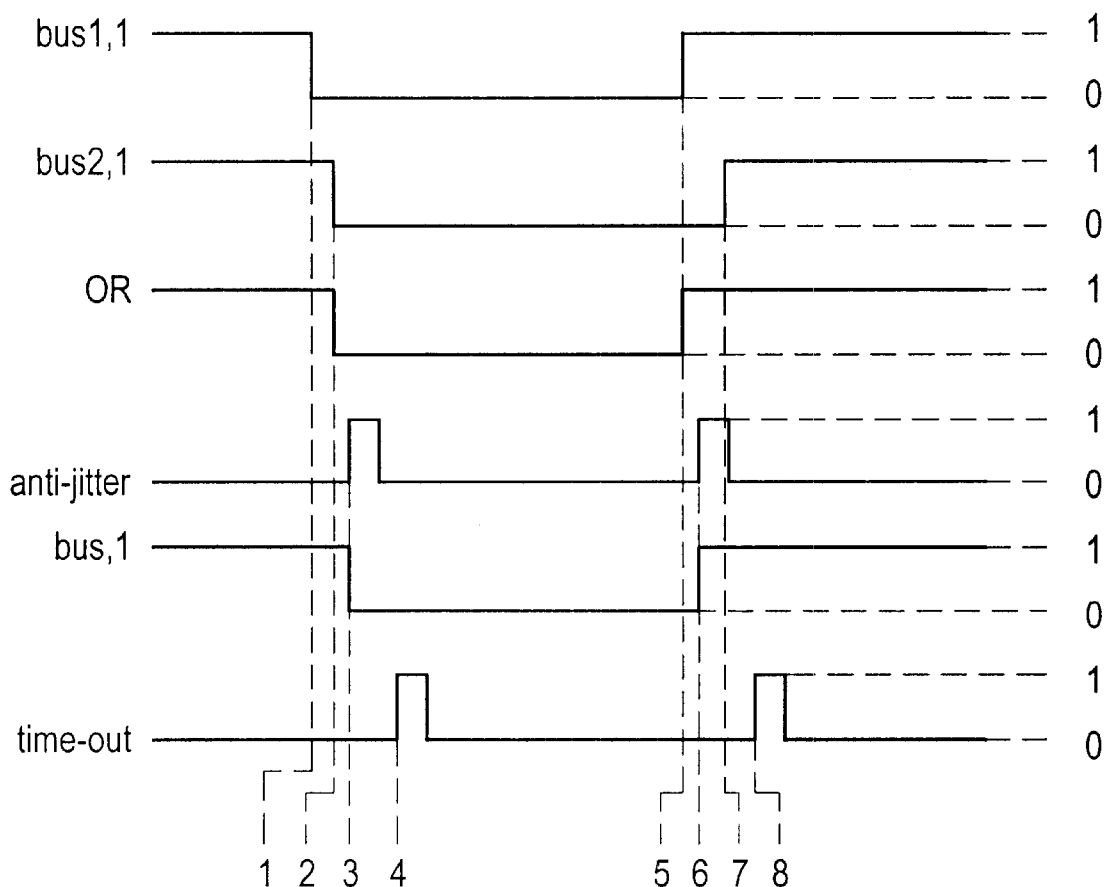

FIG. 2 Comparison stage of the functional module according to FIG. 1 with compensation for the component-tolerance-based time delay FIG. 3 Comparison state of the functional component according to FIG. 1 with query for equality of the output signals FIG. 4 Device for conditioning of the time clock signals of clock FIG. 5 Signal sequence during a process cycle FIG. 1 shows the components of a conventional computer which are relevant for the invention. CPU 1 and CPU 2 each designate a processor. Each processor is connected through a collection of lines, so-called bus lines, to a functional module I. Both processors CPU 1 and CPU 2 are of the exact same type. They have identical connected loads; however, they differ on the basis of manufacturing tolerances. The difference is designated component tolerance. Each processor has an associated bus 1 or bus 2, respectively. The terms bus 1 and bus 2 denote the collection of all lines which go out from processor CPU 1 or CPU 2 and which would be provided for controlling the peripherals if CPU 1 or CPU 2 were the single processor of a conventional computer.

Bus 1 or bus 2 contains the address bus, the data bus, and the control bus.

Therefore along with a second processor and functional module I, a separate bus is allocated to each processor in order to realize the invention.

Functional module I connects the signals on bus 1 or bus 2 to the peripherals through the bus. In an additional function, functional module I contains a component for generating the control signals "CPU clock," "anti-jitter," and "time-out." This will be further discussed with reference to FIG. 4.

The output of the functional module is realized through the bus which connects with the peripherals, i.e., all those components which in a conventional computer are triggered via the single processor or which store data, namely memory, input-output.

In the present case, it is obvious that the peripherals in contrast to the state of the art are not triggered by one processor but rather from a linked output signal from the output signals of two processors.

The clock pulse generator CGEN specifies the clock pulses for the entire system. Included in this in particular are the clock pulse signals—CPU clock, anti-jitter, and time-out—which are time delayed from each other.

It should be pointed out that the numbering with the digits 1 and 2 does not represent any kind of distinction of meaning. The two processors or the numbering can be switched without any change of function. In addition, using the device according to the present invention, it is also readily possible to operate more than two processors parallel and simultaneously. The number of parallel-operated processors is theoretically unlimited.

Over the bus, i.e., the collection of all lines which go out from functional module I, the peripheral are controlled as if the control signals came from a single processor. Therefore only the linked signals of CPU 1 and CPU 2 are conducted over the bus.

Clock pulse generator CGEN provides the clock pulse signal "clock" for controlling the entire system. This can be, for example, a conventional time-pulse generator for an individual processor. The clock-pulse signal clock is conditioned by delay elements so as to create the signals CPU clock, anti-jitter, and time-out. This will be discussed in greater detail using FIG. 4. In another method, the time-delayed signals are generated through counters and dividers which generate the time-delayed signals CPU clock, anti-jitter, and time-out from a high-frequency clock pulse through counting off predetermined numbers of clock pulses and if needed through dividing of the time intervals between two clock signals.

The signal CPU clock is the clock pulse with which the two processors CPU 1 and CPU 2 are operated. Both processors are operated in parallel with the signal CPU clock as if they were single processors.

The signal "anti-jitter" is a signal for the control of functional component 1, particularly for the control of that part of the comparison stage which is called "signal coupling" and which is discussed in greater detail using FIG. 2. This anti-jitter signal balances the differences in time behavior of the synonymous signals in bus 1 and bus 2 which can unavoidably develop between the two processors through component tolerances. Furthermore, the anti-jitter signal impacts the output memory.

The "time-out" signal serves to control that part of the comparison stage which is called "signal equality" (FIG. 3) which here is likewise integrated within functional component I.

This time-out signal indicates those points in time at which all synonymous signals in bus 1 and bus 2 must be identical. If this is not the case, the time point is fixed at which the signal "procedure error" is generated. In connection with that, the output memory can be instructed to store the error condition.

The signal "procedure error" identifies non-synchronous behavior of the two processors. This signal can initiate error-elimination measures by external components such as, for example, a system reset, or it can be processed with diagnostic software to continue operating the computer system in a stable manner.

In the figures, components and lines are referenced the same throughout.

FIG. 2 shows the arrangement of the comparison stage within functional component I where the time delay of the output signals of both computers, which is caused by component tolerance, are equalized and where the output signals are linked into a single output signal which can be utilized by the peripherals.

The signals at bus 1 and bus 2 are divided here into the individual signals with a total of N, designated for clarity with No. 1, 2, and N.

The number N indicates the number of signals necessary for a bus in parallel. For a customary 8-bit processor with 24-Kbyte address space, N=8 for the data bus and N=16 for the address bus. The designation "synonymous signals" means a synonymity for example of the signals "1 of bus 1" and "1 of bus 2," i.e., signals of the two processors from which normally the same function is expected.

The arriving signals from bus 1 or from bus 2 are split in the comparison stage "signal coupling" such that in each case two synonymous signals are switched together over an OR gate. Here the decoupling of the outputs from CPU 1 and CPU 2 takes place since the signals will not necessarily appear precisely simultaneously.

While it is also possible to cause the decoupling of the outputs through AND gates, an OR gate nevertheless offers the special advantage compared with an AND gate that the average current consumption of the signal lines of the bus are lowered since normally resistors or current sources are placed as terminators of each signal line for positive supply voltage, the current flow of which at a low level is higher that at a high level. Since the low level is present if the logical 0 is applied and a high level is present if the logical 1 signal is applied, the lower current consumption of the OR gate follows considering the statistically present average signal times.

With an OR gate, the outputs in the statistical mean are indeed longer than at level logical 1, thus in the condition of lesser current consumption than with an AND gate. At a defined point in time, the equality of the synonymous signals must be present if the processors are functioning properly. At this point in time, the signals of bus 1 and bus 2 should be coupled into a bus signal which serves as a control signal for the subsequently impacted peripherals. This control signal is held stable through the output memory in that the output memory is controlled with the anti-jitter signal.

Since the output signal of the OR gate is applied as long as the synonymous signals of the two processors have matching signal levels, the signal level of the output from the OR gate can be checked through the time-delayed anti-jitter signal, in particular upon the first pulse of the anti-jitter signal which occurs. The second pulse of the anti-jitter signal, however, lies outside of the period of time over which the output of the OR gate is held at the original signal level. The changed signal level at the point in time of the second pulse of the anti-jitter signal therefore must be detected.

If the signal from the OR gate has changed by that time, this signal can be transmitted through the bus to the peripherals as a utilizable output signal.

If this is not the case, a time-out signal occurs in accordance with FIG. 3.

For this purpose, FIG. 3 shows the arrangement of the comparison level "signal equality?" within functional module I where the output signals of the two processors CPU 1 and CPU 2 are queried for equality at points in time at which the same signal levels, taking into account the known component tolerances, must be present on each signal pair. If there is a deviation in signal level even within one pair of output signals, a procedure error is outputted. The collective signals bus 1 and bus 2 are likewise divided here into the individual signals, N in number, only the numbers 1, 2, and N being designated here for clarity.

In each case two like-names signals from bus 1 or bus 2 are switched together through an EXOR gate. In this EXOR gate the comparison of the outputs of CPU 1 and CPU 2 occurs.

At a defined point in time, all synonymous signals must be in agreement.

In order to detect this, the equality of all signals compared in the individual EXOR gates is then tested with a common OR gate since a single deviation of any one of the checked signals will cause a procedure error to be displayed. At the point in time of the checking, the time-out signal is then outputted for activation of the output memory. The resulting output signal of the downstream OR gate in the expected and normally present error-free case is logical 0 or low or inactive. If agreement of al signals at this point in time was not achieved, the output signal is logical 1 or high or active. Accordingly, a procedure error is present. This output signal can be evaluated by external components, for example, for the generation of a system reset.

The linking of these functions is essentially dependent on the generation of clock pulse. On the one hand, the time-delayed clock pulses required for this can be achieved through suitable switching of counters and dividers. FIG. 4 shows in this instance a version of clock-pulse generation with delay elements. One part of this element of functional module I is a synchronization component of this kind in accordance with FIG. 4. The arriving clock-pulse signal clock is divided among four different delay elements D1–D4 which receive the input signal clock unchanged but relay the signal to their output with a fixed time delay. Thus in the synchronization component, the arriving clock pulse signal clock is changed into a processor clock signal CPU-clock through delay element D1, into a linking signal "anti-jitter" through delay elements D2 and D3, and into the signal time-out through delay element D4.

The signal time-out is a scanning signal for the procedure error time signal.

Delay elements D2 through D4 impact the monoflops M2 through M4. Monoflops M2 to M4 are different monoflops which, beginning with the point in time of the edge of the input signal, generate an output pulse of a specified length. Monoflop M2 reacts upon rising edge; monoflop M3 reacts upon falling edge; monoflop M4 does not have to be designated.

In this regard it is important that the delays be specified by the delay elements such that the signal clock is delayed for the generation of the signal CPU clock such that the run times of the other signal evaluations, specifically anti-jitter and time-out, are balanced out.

The arriving signal clock has a positive and a negative edge. From this, an initial short pulse is generated through monoflop M2 upon the positive edge of the signal clock which is very short in relation to the run time of the processor signal. From the negative edge of the signal clock, a short pulse is likewise generated through monoflop M3. The two pulses of the anti-jitter signal identify the points in time at which the synonymous lines from bus 1 and bus 2 must have reached the same condition and at which these signals of the periphery must be brought back through the line bus.

The signal time-out identifies a point in time after the second pulse (falling edge of the signal clock) of the signal anti-jitter at which the signals of the synonymous lines are queried for equality in order to generate the signal "procedure error" in the event of inequality. In this connection, FIG. 5 shows the signals using the example of an address signal on line 1 bus 1 and bus 2. The address signals are referenced bus 1,1 and bus 2,1. The important points in time are designated at the bottom with the numbers 1 through 8. The signal levels low and high are designated "0" and "1."

At time point 1, the signal of CPU 1, which happened to be somewhat earlier, goes to 0.

At time point 2, the signal of CPU 2, which happened to be later, goes to 0.

At the OR gate according to FIG. 2, an output signal 0 is applied which persists during that time range in which the signals bus 1,1 and bus 2,1 are identically 0. This time period is between time point 2 and time point 5. The output signal of the OR gate is formed in this time period from the two synonymous signals of bus 1 and bus 2. Since there is agreement of the output signals bus 1 and bus 2, the output signal of the OR gate according to FIG. 2 can be filed via the bus in the output memory as signal 0. The output signal of this output memory represents a stable likeness of the address signal, delayed by a few nanoseconds, linked from the signals on lines 1 from bus 1 and bus 2 and extends from time point 3 through time point 6. This is the signal bus, 1 which is suitable for controlling the peripherals over line 1 of the bus.

The point in time at which signal 0 is transmitted over bus, 1 to the output memory coincides with the first short pulse of the signal anti-jitter. It continues until the second short pulse of the signal anti-jitter begins.

In the time period between, a first scanning by the signal time-out takes place, beginning at time point 4. At this moment there is equality between the signals bus 1,1 and bus 2,1.

Accordingly no procedure error is present.

At time point 5, the OR gate shows a usable signal 1 at its output since the signal of CPU 1 which began somewhat earlier now goes to 1.

This signal 1 is stored at time point 1 in the output memory according to FIG. 2. Time point 6 coincides with the beginning of the second pulse of the signal anti-jitter. Since at this time point one of the signals bus 1,1 or bus 2,1 has already gone to logical 1, the same can likewise be expected shortly for the other of signals bus 1,1 or bus 2,1. Here this is the case at time point 7. At this time point the signal of CPU 2 which here happens to be later is likewise at logical 1. This time point nevertheless is of significance only with respect to any possible procedure error. Since this time point must occur prior to the appearance of the signal time-out (time point 8), a procedure error is present if at time point 8 the processor which happens to be later (here CPU 2) has not yet gone to logical 1.

Thus with proper operation, it is ensured that time point 7 is prior to time point 8. At time point 8, the second scanning by the signal time-out takes place. Here the equality of the synonymous signals is present again. No procedure error is present.

Nevertheless, if the line bus 2,1 were still in the condition logical 0, the inequality with the signal bus 1,1 at this point in time would have generated the signal "procedure error."

The output memories which are not depicted in detail are in each case a conventional, edge-controlled D-flipflip.

What is claimed is:

1. Device for the operation of two functionally parallel processors (CPU 1, CPU 2) of known manufacturing-related component tolerances of which each is clock-pulse triggered (CPU clock) with both processors (CPU 1, CPU 2) being cycled via a common clock (CGEN) and with both processors (CPU 1, CPU 2) being synchronously cycled and with the output signals of both processor s (bus 1,1 . . . N and bus 2, 1 . . . N) being brought to a functional (I) in which the module-tolerance-caused delay of the output signals (bus 1,1 . . . N) and bus 2,1 . . . N) of the two processors (CPU 1, CPU 2) is compensated for and which are used for a single control function, characterized in that;

the two processors (CPU 1, CPU 2) are operated parallel with each other and that for this purpose the signals, which are time delayed for this purpose, are generated from the clock pulse (clock) of a single clock pulse generator (CGEN) for the entire system through parallel conditioning of its clock pulse signals, of which one is the signal CPU-clock, another serves to compensate for differences in the time behavior of like-named signals in bus 1 and bus 2 (signal anti-jitter), and another indicates those points in time at which all like-named signals in bus 1 and bus 2 must be identical (signal time out) and that the functional module (I) in addition to the output signals (bus 1,1 . . . N or bus 2,1 . . . N) of the two processors (CPU 1, CPU 2) is impacted by the parallel but delayed signals anti-jitter and time-out, and that with the compensation of the module-tolerance-caused delayed simultaneously the output signals (bus 1,1 . . . N and bus 2,1 . . . N) are linked into a single output signal (bus, 1 . . . N) which can be used for the peripherals of the computer.

2. Device according to claim 1 characterized in that the functional module performs two evaluations of the module-tolerance-caused time delays, specifically by the criterion:

a. time delay still acceptable and usable and secondly by the criterion:

b. time delay no longer acceptable.

3. Device according to claim characterized in that the functional module is clocked with a time delay in which between two clock pulses the same levels of output signals of the two processors (CPU 1, CPU 2) are expected within the module tolerances and whereby the time delayed clock pulses serve for the generation of the output signal (bus 1 . . . N), and in which any unlike levels of output signals of the two processors (CPU 1, CPU 2) outside of their module tolerances are marked as errors.

4. Device according to claim 1 characterized in that monitoring of the functional module takes place during the operating cycles of the two processors (CPU 1, CPU 2) in which the processors (CPU 1, CPU 2) are operated at full operating speed and in that monitoring takes place as long as the synonymous signals of the two processors (CPU 1, CPU 2) have a signal level which agrees (logical 0, logical 1).

5. Device according to claim 1 characterized in that the output signals (bus 1,1 . . . N, bus 2,1 . . . N) of the two processors (CPU 1, CPU 2) are electrically decoupled from each other and are linked into a test signal (OR) which is scanned by an edge signal (anti-jitter) at specified offset points in time (3,6) with each scanned test signal being held stable at the last value of the test signal (OR) by an output memory until the next scan time point (6) and in that the signal which is held stable is the utilized, single output signal (bus, 1 . . . N) for the peripherals.

6. Device according to claim 5 characterized in that the output signals (bus 1,1 . . . N and bus 2,1 . . . N) of the two processors (CPU 1, CPU 2) are decoupled with OR gates.

7. Device according to one of claim 1 characterized in that the output signals (bus 1,1 . . . N and bus 2,1 . . . N) of the two processors (CPU 1, CPU 2) are queried for equality at points in time (4, 8) at which the same signal levels (logical 0, logical 1), taking into account the known module tolerances, must be present on each signal pair (bus 1,1, bus 2,1; bus 1,2, bus 2,2; bus 1,N, bus 2,N) and in that on each signal level deviation even within only one pair of output signals, a procedure error is outputted.

8. Device according to claim 7 characterized in that the equality query takes place in an EXOR gate.

9. Device according to claim 7 characterized in that the equality query takes place in each case after completion of processing cycle of the two processors.

10. Device according to one of claim 1 characterized in that an arriving time signal (clock) offset to a processor clock pulse signal (CPU clock) and to a linking signal (anti-jitter) and if appropriate to a procedure error time signal (time-out) is conditioned in a synchronization module.

11. Device according to claim 10 characterized in that the signal conditioning takes place over delay elements (D1, D2, D3, D4) which are parallel to each other and which are impacted with the arriving time signal (clock) in parallel manner.

12. Device according to claim 11 characterized in that the signal anti-jitter is generated from the outputs of two delay elements (D2, D3) of which the first (D2) is generates a short pus via a monoflop (M2), reacting to rising edges, and of which the second (D3) generates a short pulse via another monoflop (M3) reacting to falling edges.

13. Device according to claim 10 characterized in that the signal conditioning takes place via counter and decoder from a higher frequency time clock pulse signal.

\* \* \* \* \*